(12) United States Patent
Utsunomiya

(10) Patent No.: US 11,325,545 B2
(45) Date of Patent: May 10, 2022

(54) ROTARY CONNECTOR DEVICE AND ROTARY CONNECTOR DEVICE ASSEMBLED STRUCTURE

(71) Applicants: FURUKAWA ELECTRIC CO., LTD., Tokyo (JP); FURUKAWA AUTOMOTIVE SYSTEMS INC., Inukami-gun (JP)

(72) Inventor: Hirofumi Utsunomiya, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 17/021,003

(22) Filed: Sep. 15, 2020

(65) Prior Publication Data

US 2021/0001789 A1    Jan. 7, 2021

Related U.S. Application Data

(63) Continuation of application No. PCT/JP2019/011144, filed on Mar. 18, 2019.

(30) Foreign Application Priority Data

Mar. 19, 2018  (JP) .............................. JP2018-050898

(51) Int. Cl.
*H01R 3/00*     (2006.01)
*B60R 16/027*   (2006.01)
(Continued)

(52) U.S. Cl.
CPC .......... *B60R 16/027* (2013.01); *B62D 15/021* (2013.01); *H01R 35/025* (2013.01); *H01R 35/04* (2013.01)

(58) Field of Classification Search
CPC .... H01R 35/025; H01R 35/04; B62D 15/021; B60R 16/027
(Continued)

(56) References Cited

U.S. PATENT DOCUMENTS 5,286,219 A * 2/1994 Ueno .................... H02G 11/00
439/15
5,314,344 A * 5/1994 Ida ........................ H02G 11/00
439/15
(Continued)

FOREIGN PATENT DOCUMENTS

CN       103490244 A      1/2014
CN       103633524 A      3/2014
(Continued)

OTHER PUBLICATIONS

International Search Report dated May 7, 2019 in PCT/JP2019/011144 filed on Mar. 18, 2019 (with English Translation), 5 pages.
(Continued)

*Primary Examiner* — Abdullah A Riyami
*Assistant Examiner* — Vladimir Imas
(74) *Attorney, Agent, or Firm* — Oblon, McClelland, Maier & Neustadt, L.L.P.

(57) ABSTRACT

A rotary connector device is provided, which includes a moving member on a stator side in an insertion direction of a steering shaft, the moving member including a first recessed portion recessed in the insertion direction and located in a first direction (X) orthogonal to a center axis (Cx) of the stator, and a second recessed portion recessed in a direction opposite to the first recessed portion and located in a second direction (Y); a rotator including a first guide portion configured to loosely fit together with and guide the first recessed portion; a rotating portion provided in the stator and configured to rotate about the center axis (Cx)
(Continued)

includes a second guide portion configured to loosely fit together with and guide the second recessed portion; and the first recessed portion and the second recessed portion are capable of movement in the first direction (X) and the second direction (Y).

11 Claims, 9 Drawing Sheets

(51) Int. Cl.
    *B62D 15/02*     (2006.01)
    *H01R 35/02*     (2006.01)
    *H01R 35/04*     (2006.01)

(58) Field of Classification Search
    USPC .......................................................... 439/164
    See application file for complete search history.

(56) References Cited

U.S. PATENT DOCUMENTS

| | | | | |
|---|---|---|---|---|
| 5,409,389 | A * | 4/1995 | Shibata | B60R 16/027 439/15 |
| 5,674,082 | A * | 10/1997 | Okuhara | B60R 16/027 439/15 |
| 5,980,285 | A * | 11/1999 | Matsumoto | B60R 16/027 439/15 |
| 6,147,416 | A * | 11/2000 | Mitsuzuka | B60R 16/027 200/61.54 |
| 6,155,106 | A * | 12/2000 | Sano | B60R 16/027 33/1 N |
| 6,261,112 | B1 * | 7/2001 | Mitsui | B60R 16/027 439/15 |
| 6,272,912 | B1 * | 8/2001 | Sano | B62D 15/02 33/1 N |
| 6,367,337 | B1 * | 4/2002 | Schlabach | B62D 6/10 180/443 |
| 6,409,527 | B1 * | 6/2002 | Adachi | B60R 16/027 439/15 |
| 6,471,529 | B2 * | 10/2002 | Oishi | B60R 16/027 439/164 |
| 7,445,451 | B2 * | 11/2008 | Tanaka | B60R 16/027 439/15 |
| 7,665,573 | B2 * | 2/2010 | Lee | B62D 15/0215 180/444 |
| 7,758,363 | B2 * | 7/2010 | Tanaka | G01D 11/245 439/164 |
| 7,868,611 | B2 * | 1/2011 | Sano | G01D 5/12 324/207.25 |
| 8,808,016 | B2 * | 8/2014 | Adachi | H02G 11/02 439/164 |
| 8,986,026 | B2 * | 3/2015 | Utsunomiya | H01R 35/025 439/164 |
| 9,337,600 | B2 * | 5/2016 | Utsunomiya | H01R 35/04 |
| 9,882,329 | B2 * | 1/2018 | Legoubin | F16L 33/02 |
| 10,259,499 | B2 * | 4/2019 | Adachi | B60R 16/027 |
| 10,981,525 | B2 * | 4/2021 | Hiroki | H01R 35/04 |
| 2003/0041677 | A1 | 3/2003 | Schlabach | |
| 2005/0155830 | A1 * | 7/2005 | Huang | H01R 35/025 191/12.2 R |
| 2007/0004236 | A1 * | 1/2007 | Suenaga | H01R 35/04 439/15 |
| 2010/0190557 | A1 | 7/2010 | Suzuki et al. | |
| 2010/0235054 | A1 * | 9/2010 | Hoskins | B62D 15/0245 701/42 |
| 2012/0011959 | A1 * | 1/2012 | Park | B60R 16/027 74/527 |
| 2013/0330946 | A1 | 12/2013 | Umemura et al. | |
| 2014/0051266 | A1 | 2/2014 | Aikawa et al. | |
| 2014/0266168 | A1 * | 9/2014 | Utsunomiya | B62D 15/0215 324/207.25 |

FOREIGN PATENT DOCUMENTS

| | | |
|---|---|---|
| CN | 207080518 U | 3/2018 |
| DE | 10 2008 063 951 A1 | 6/2010 |
| EP | 0 989 050 A1 | 3/2000 |
| JP | 2000-159037 A | 6/2000 |
| JP | 2006-335318 A | 12/2006 |
| JP | 2009-217974 A | 9/2009 |
| JP | 2010-129187 A | 6/2010 |
| JP | 2010-177039 A | 8/2010 |
| WO | WO 03/021125 A1 | 3/2003 |

OTHER PUBLICATIONS

Combined Chinese Office Action and Search Report dated Apr. 30, 2021 in Chinese Patent Application No. 21980017629.8 (with English translation), 19 pages.
Extended European Search Report dated Mar. 12, 2021 in corresponding European Patent Application No. 19772149.1 7 pages.
Chinese Office Action dated Dec. 17, 2021 in Chinese Patent Application No. 201980017629.8 w/English translation, 17 pages.
Official Communication issued in European Patent Application No. 19 772 149.1 dated Nov. 30, 2021, 5 pages.
Korean Office Action dated Mar. 10, 2022 in Korean Patent Application No. 10-2020-7026771 (with English translation), 13 pages.

* cited by examiner

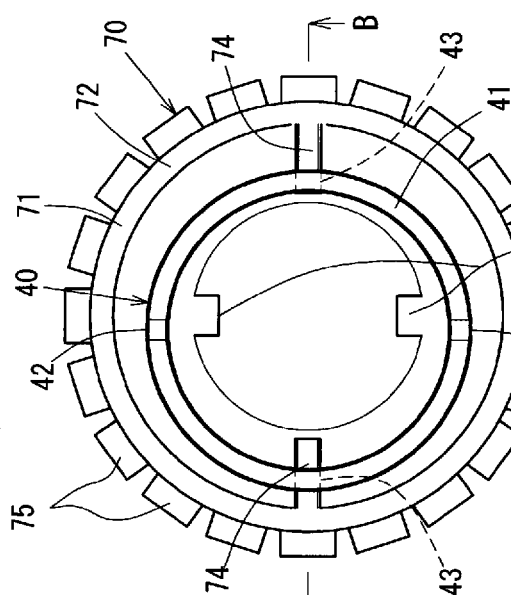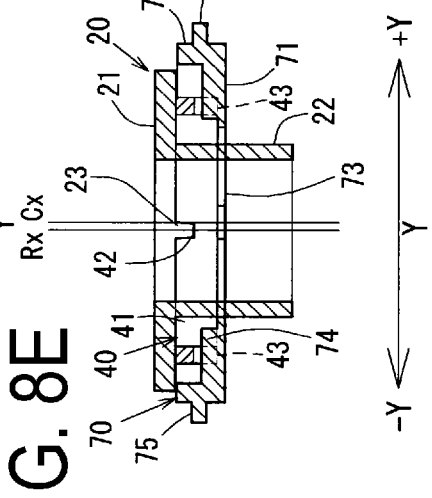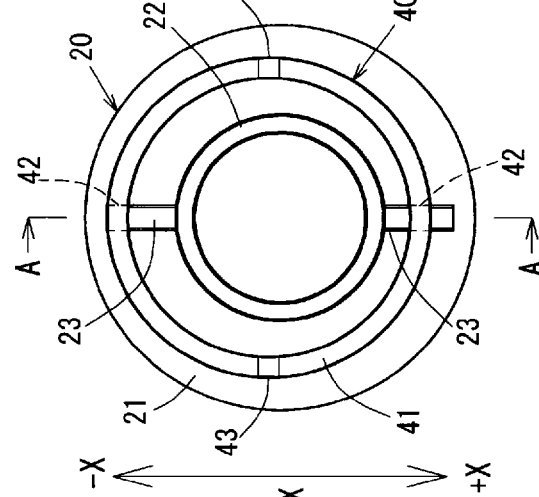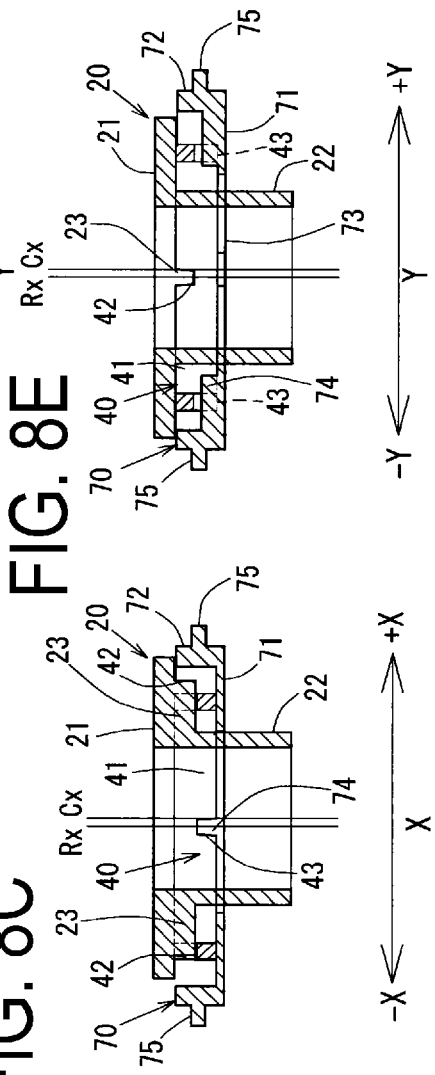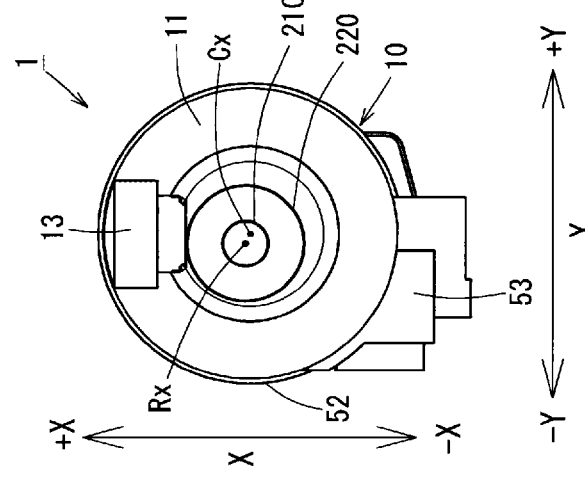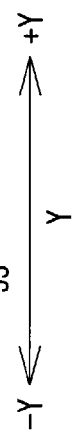

ROTARY CONNECTOR DEVICE AND ROTARY CONNECTOR DEVICE ASSEMBLED STRUCTURE

CROSS-REFERENCE TO RELATED APPLICATION

The present application is a continuation application of International Application No. PCT/JP2019/011144, filed Mar. 18, 2019, which claims priority to Japanese Patent Application No. 2018-050898 filed Mar. 19, 2018. The contents of these applications are incorporated herein by reference in their entirety.

TECHNICAL FIELD

The disclosure, for example, relates to a rotary connector device installed in a vehicle such as an automobile and a rotary connector device assembled structure for assembling the rotary connector device together with a vehicle.

BACKGROUND ART

A rotary connector device installed in a vehicle body of an automobile or the like has a configuration in which a rotation body and a fixed body are assembled together in a manner allowing for relative rotation, and, in an annular housing space formed between the rotation body and the fixed body, a flexible flat cable is housed that winds and unwinds in sync with the rotation of the rotation body.

An example of such a proposed rotary connector device includes a rotary connector device that includes a rotation body including a first rotation body and a second rotation body that, together with the first rotation body, sandwiches a fixed body and is capable of rotating relative to the fixed body; and an intermediate elastic member interposed between the first rotation body and the second rotation body and provided with elongated holes elongated in a radial direction and notches (see Patent Document 1).

In the rotary connector device described in Patent Document 1, protrusions provided on the first rotation body are engaged with the elongated holes provided on the intermediate elastic member and protrusions provided on the second rotation body are fitted in the notches. In this way, any wobble in the rotation of the first rotation body can be absorbed by the intermediate elastic member, and the second rotation body that, together with the first rotation body, sandwiches the fixed body can rotate smoothly.

However, when the rotary connector device is in an installed state installed in a vehicle, the rotation axis of a steering shaft inserted inside the rotary connector device and the center axis of the rotary connector device may be eccentric to one another. In this case, even with the rotary connector device described in Patent Document 1, a rotating portion at a portion of the fixed body may not rotate smoothly.

CITATION LIST

Patent Documents

Patent Document 1: JP 2006-335318A

SUMMARY

Technical Problem

In light of the problems described above, an object of the disclosure is to provide a rotary connector device and a rotary connector device assembled structure in which, even in a case where a rotation axis of a steering shaft and a center axis of the rotary connector device are eccentric to one another, a rotating portion at a portion of a fixed body can rotate smoothly.

Solution to Problem

An embodiment of the disclosure is a rotary connector device, the rotary connector device including:
a fixed body configured to be fixed to a vehicle, the fixed body including a stationary-side ring plate having an annular shape and an outer circumference wall portion having a cylindrical shape and formed on an outer circumferential edge of the stationary-side ring plate;
a rotation body assembled together with the fixed body in a manner allowing for rotation relative to the fixed body, the rotation body including a rotating-side ring plate having an annular shape and an inner circumference wall portion having a cylindrical shape and formed on an inner circumferential edge of the rotating-side ring plate; and
a flexible flat cable stored in a housing space formed between the fixed body and the rotation body, the flexible flat cable including a conductor with one end portion fixed to the fixed body and another end portion fixed to the rotation body;
wherein a rotation transmission mechanism configured to transfer rotation of the rotation body to the fixed body is provided on an insertion direction side of the fixed body in a direction in which a steering shaft is inserted in the inner circumference wall portion;
the rotation transmission mechanism includes
a first guide target portion formed, in a first direction orthogonal to a rotation axial direction about which the fixed body rotates, as a protrusion portion projecting or a recessed portion recessed in the insertion direction of the steering shaft, and
a second guide target portion formed, in a second direction that intersects the first direction and is orthogonal to the rotation axial direction, as a protrusion portion projecting or a recessed portion recessed in a direction opposite to a direction in which the protrusion portion of the first guide target portion projects or the recessed portion of the first guide target portion recesses;
the rotation body includes a first guide portion configured to loosely fit together with the first guide target portion;
the fixed body includes a rotating portion configured to rotate about a center axis, and the rotating portion includes a second guide portion configured to loosely fit together with the second guide target portion; and
the first guide target portion loosely fitted together with the first guide portion and the second guide target portion loosely fitted together with the second guide portion are guided by the first guide portion and the second guide portion in a manner allowing for movement in the first direction and the second direction.

Another embodiment of the disclosure is a rotary connector device assembled structure, the rotary connector device assembled structure including:
a rotary connector device and a steering shaft assembled together,
the rotary connector device including
a fixed body configured to be fixed to a vehicle, the fixed body including a stationary-side ring plate having an annular shape and an outer circumference wall portion having a cylindrical shape and formed on an outer circumferential edge of the stationary-side ring plate, a rotation body assembled together with the fixed body in a manner allowing for rotation relative to the fixed body, the rotation body including a rotating-side ring plate having an annular shape and an inner circumference wall portion having a cylindrical shape and formed on an inner circumferential edge of the rotating-side ring plate, and a flexible flat cable stored in a housing space formed between the fixed body and the rotation body, the flexible flat cable including a conductor with one end portion fixed to the fixed body and another end portion fixed to the rotation body; and the steering shaft inserted in the inner circumference wall portion and configured to rotate integrally with the rotation body;

wherein a rotation transmission mechanism configured to transfer rotation of the rotation body to the fixed body is provided on an insertion direction side of the fixed body in a direction in which the steering shaft is inserted in the inner circumference wall portion;

the rotation transmission mechanism includes a first guide target portion formed, in a first direction orthogonal to a rotation axial direction about which the fixed body rotates, as a protrusion portion projecting or a recessed portion recessed in the insertion direction of the steering shaft, and a second guide target portion formed, in a second direction that intersects the first direction and is orthogonal to the rotation axial direction, as a protrusion portion projecting or a recessed portion recessed in a direction opposite to a direction in which the protrusion portion of the first guide target portion projects or the recessed portion of the first guide target portion recesses;

the rotation body includes a first guide portion configured to loosely fit together with the first guide target portion;

the fixed body includes a rotating portion configured to rotate about a center axis, and the rotating portion includes a second guide portion configured to loosely fit together with the second guide target portion; and the first guide target portion loosely fitted together with the first guide portion and the second guide target portion loosely fitted together with the second guide portion are guided by the first guide portion and the second guide portion in a manner allowing for movement in the first direction and the second direction.

The rotation body may have a configuration including only a rotator including the annular rotating-side ring plate and a cylindrical rotating-side inner-circumferential cylindrical portion formed on the inner circumferential edge of the rotating-side ring plate, or may have a configuration in which a sleeve is assembled together with the rotator and integrally rotates therewith.

In the case in which the rotation body is constituted of the rotator and the sleeve, the inner circumference wall portion may include only the inner circumference wall portion of the rotator or may also include the inner circumference wall portion of the sleeve, for example.

The fixed body includes the stationary-side ring plate and a cylindrical outer circumference wall portion formed on the outer circumferential edge of the stationary-side ring plate and may have a configuration including a stator for fixing to a vehicle and a steering angle sensor assembled together with the stator or a configuration including a part of a vehicle such as a combination switch.

The first guide target portion may have a configuration in which it is constituted by a protrusion portion projecting in the direction opposite to the insertion direction or constituted by a recessed portion recessed in the insertion direction.

The rotating portion may only rotate about the center of rotation of the center axis or may include a portion that pivots about the center axis.

"Loosely fit" refers to a state in which the first guide target portion and the second guide target portion are guided by the first guide portion and the second guide portion, with the portions being loosely fitted together allowing for movement in the first direction and the second direction.

According to embodiments of the disclosure, when a rotation axis of a steering shaft and a center axis of the rotary connector device are eccentric to one another, a rotating portion, a portion of a fixed body, can rotate smoothly.

Specifically, the first guide target portion loosely fitted together with the first guide portion provided on the rotation body can move in the first direction. This allows the eccentricity in the first direction between the rotation body and the rotating portion constituting the rotary connector device to be absorbed.

Similarly, the second guide target portion loosely fitted together with the second guide portion provided on the rotating portion can move in the second direction. This allows the eccentricity in the second direction between the rotation body and the rotating portion constituting the rotary connector device to be absorbed.

In this manner, the eccentricity between the rotation body and the fixed body that constitute the rotary connector device can be absorbed by the first guide target portion and the second guide target portion. In other words, the eccentricity between the rotation axis of the steering shaft and the center axis of the rotating portion can be absorbed, allowing the rotation of the steering shaft to be transferred to the rotating portion as rotation about the center axis. In this way, when a rotation axis of the steering shaft and a center axis of the rotary connector device are eccentric to one another, the rotating portion, a portion of a fixed body, can rotate smoothly. This allows the rotation of the steering shaft to be transferred to the rotating portion with high accuracy.

An aspect of the disclosure may have a configuration in which the first guide target portion is constituted by a first recessed portion recessed toward the rotating portion; and the second guide target portion is constituted by a second recessed portion recessed in a direction opposite to a recessed direction of the first guide target portion.

According to the disclosure, the rotation of the steering shaft can be more accurately transferred to the rotating portion.

More specifically, the first recessed portion and the first guide portion are loosely fitted together, bringing the rotation body and the rotation transmission mechanism into contact with one another. Also, the second recessed portion and the second guide portion are loosely fitted together, bringing the rotating portion and the rotation transmission mechanism into contact with one another.

Accordingly, the rotating portion can be stably disposed without being supported by the first guide portion and the second guide portion formed in a protrusion, movement in the first direction via the loose fit between the first recessed portion and the first guide portion and movement in the second direction via the loose fit between the second recessed portion and the second guide portion can be stabilized, and warping of the rotation transmission mechanism due to the load on the rotation transmission mechanism can be prevented. In this way, the rotation of the steering shaft can be more accurately transferred to the rotating portion.

Additionally, according to the present configuration, the plate thickness of the rotation transmission mechanism is thick, giving the rotation transmission mechanism high rigidity and sufficient strength against the load on the rotation transmission mechanism when the eccentricity between the rotation axis of the steering shaft and the center axis of the rotating portion is absorbed.

An aspect of the disclosure may have a configuration in which the first guide target portion is constituted by a first protrusion portion projecting toward the stationary-side ring plate; and the second guide target portion is constituted by a second protrusion portion projecting in a direction opposite to a projecting direction of the first guide target portion.

According to the disclosure, the rotary connector device can be made more compact.

More specifically, the first guide target portion and the second guide target portion are constituted by the first protrusion portion and the second protrusion portion. Thus, even in the case of the rotation transmission mechanism being brought close to the rotating portion and the rotation body, interference between the first protrusion portion that fixes to the rotation body and the rotation body can be prevented, and interference between the second protrusion portion that fixes to the rotation body and the rotation body can be prevented. This allows the rotary connector device to be made compact.

Another aspect of the disclosure may have a configuration in which a plurality of the first guide target portions are disposed at rotationally symmetrical positions with a rotation axis of the fixed body as a symmetrical axis; and a plurality of the second guide target portions are disposed at rotationally symmetrical positions with the rotation axis of the fixed body as a symmetrical axis.

According to the disclosure, two of the first guide target portions and two of the second guide target portions are disposed at opposite location. This allows the rotation of the steering shaft to be transferred to the fixed body with greater stability.

Another aspect of the disclosure may have a configuration in which the first direction and the second direction are orthogonal to one another.

According to the disclosure, because the load acting on the rotation transmission mechanism is divided into that in the first direction and that in the second direction orthogonal thereto, the load acting in the first direction and the second direction can be efficiently dispersed. In this way, the rotation of the steering shaft can be transferred to the rotating portion with greater stability, and load concentration in one direction can be prevented.

Another aspect of the disclosure may have a configuration in which the rotation transmission mechanism is constituted by a rigid member ring plate.

According to the disclosure, the durability of the rotation transmission mechanism can be improved. Note that the ring plate may be made of, for example, metal, such as stainless steel, iron, and aluminum, ceramic, or the like.

Another aspect of the disclosure may have a configuration in which a gap is provided between the fixed body and the rotation transmission mechanism in the first direction and the second direction.

According to the disclosure, the first guide target portion and the second guide target portion can reliably move in the first direction and the second direction. This allows the eccentricity between the steering shaft and the rotating portion to be reliably absorbed.

Another aspect of the disclosure may have a configuration in which a support member supporting the rotation transmission mechanism is provided between the rotation transmission mechanism and the fixed body.

According to the disclosure, the rotation of the steering shaft can be transferred to the fixed body via the support member, utilizing an existing fixed body.

Another aspect of the disclosure may have a configuration in which the fixed body includes a first fixed body including the stationary-side ring plate and the outer circumference wall portion, and a second fixed body fixed to the first fixed body and including the rotating portion.

The second fixed body, for example, includes a combination switch installed in the rotary connector device, a cancel cam returning the rotation of a turn lever to a neutral position, or a steering angle sensor that detects the rotation angle of the steering shaft, for example.

According to the disclosure, the rotation from the rotating portion that rotates smoothly in accordance with the rotation of the rotation body can be smoothly transferred to the second fixed body. In this way, in the case of the second fixed body being a cancel cam, for example, the rotation of the steering shaft can be accurately transferred to the cancel cam, allowing the turn lever to be accurately returned to the neutral position.

Another aspect of the disclosure may have a configuration in which the second fixed body includes a steering angle sensor configured to detect a rotation angle of the steering shaft.

According to the disclosure, the rotation angle of the steering shaft can be accurately detected. Thus, for example, in a vehicle type in which the illumination direction of the front lights changes in accordance with the rotation angle of the steering shaft, the illumination direction of the front lights can be made more accurate.

Advantageous Effects of Invention

The disclosure can provide a rotary connector device and a rotary connector device assembled structure in which, even in a case where a rotation axis of a steering shaft and a center axis of the rotary connector device are eccentric to one another, a rotating portion at a portion of a fixed body, can rotate smoothly.

BRIEF DESCRIPTION OF DRAWINGS

FIGS. 8A to 8E are explanatory diagrams of the movement of the moving member relative to the sleeve and the steering device.

A rotary connector device 1 and a rotary connector device 1 assembled structure 2 in which the rotary connector device 1 is assembled with a steering shaft 200 will be described below with reference to FIGS. 1 to 6B.

Figure 1:
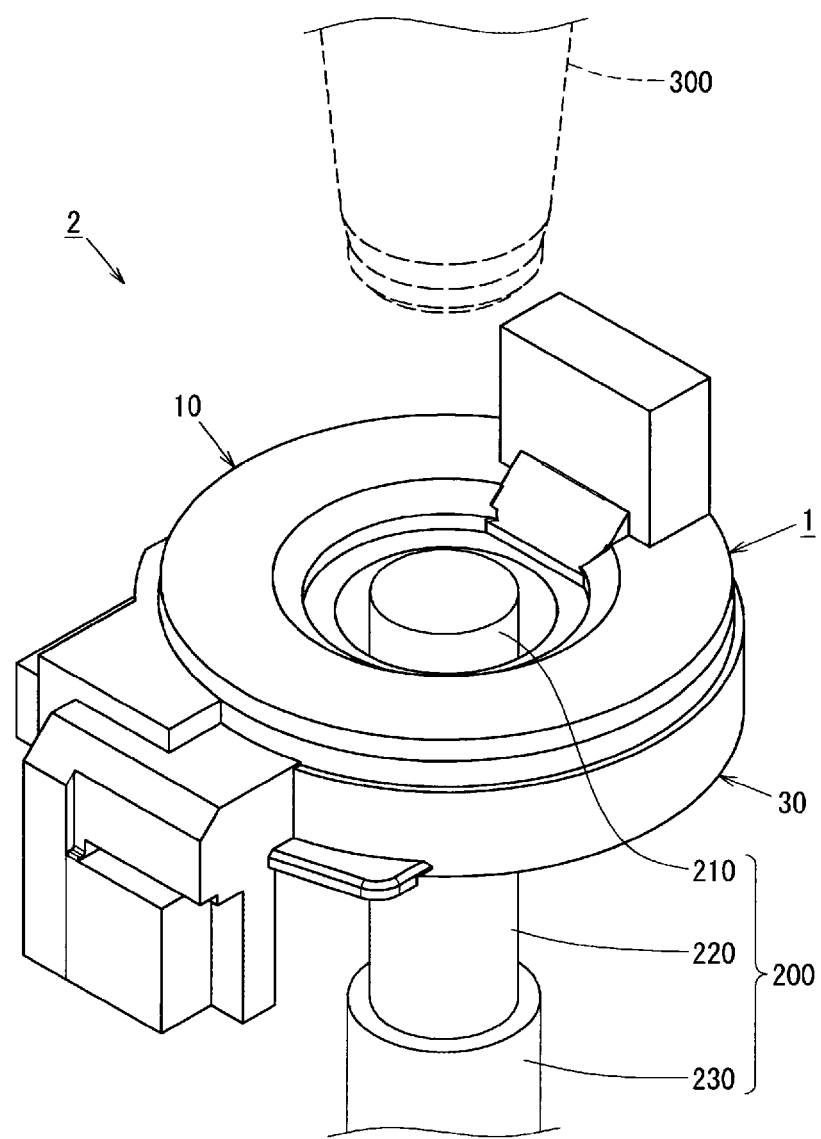
FIG. 1 is a schematic perspective view of a rotary connector device.
Figure 2:
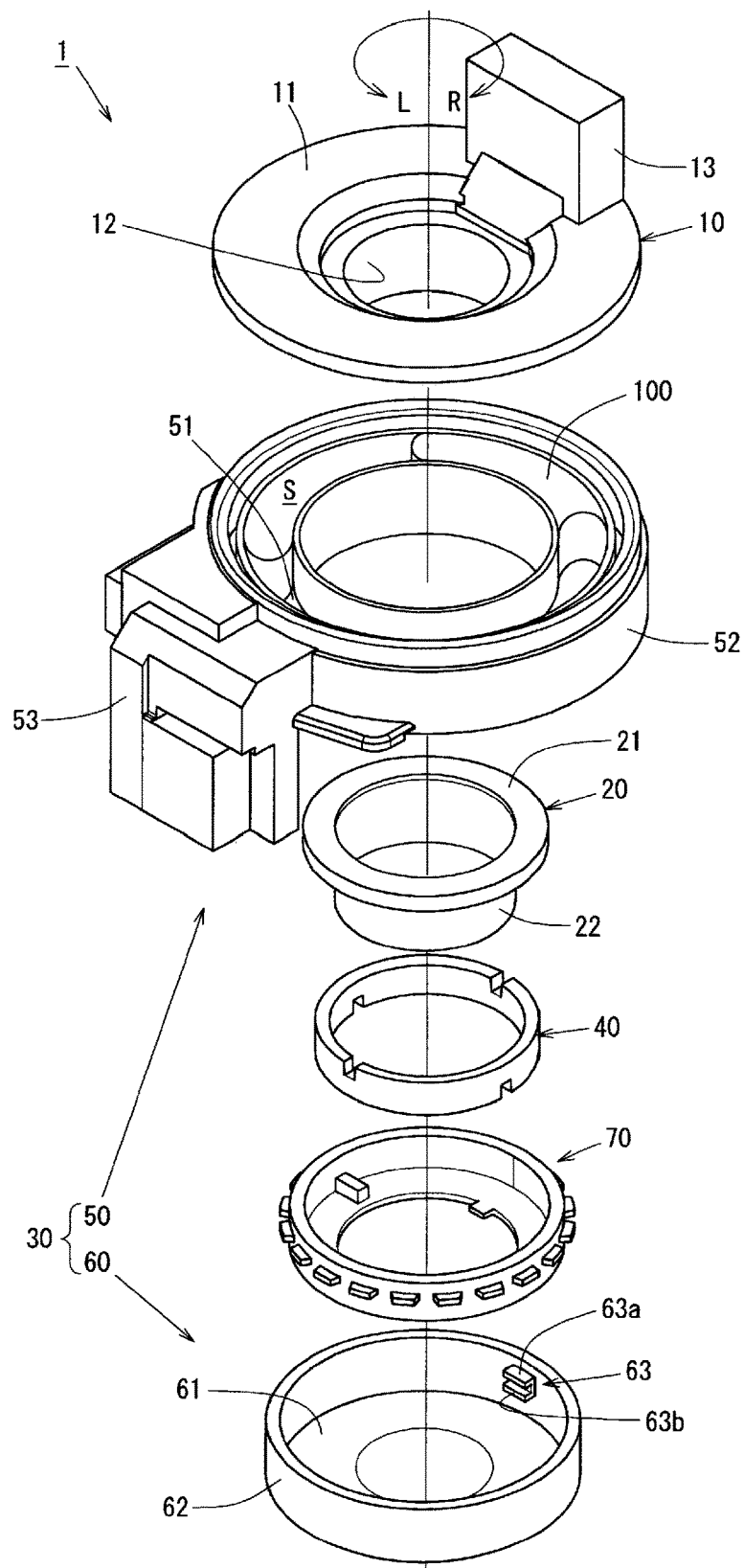
FIG. 2 is a schematic exploded perspective view of the rotary connector device.

FIG. 1 is a schematic perspective view from above of the rotary connector device 1 in a neutral state. FIG. 2 is a schematic exploded perspective view from above of the rotary connector device 1 in a neutral state. Here, the direction in which a rotator 10 is located relative to a stator 30 is defined as up, and the direction in which a sleeve 20 is located related to the stator 30 is defined as down. In addition, in the drawing of FIG. 2, the right rotation direction about a center axis Cx of the rotary connector device 1 is defined as a clockwise direction R, and the left rotation direction is defined as a counterclockwise direction L.

Figure 3:
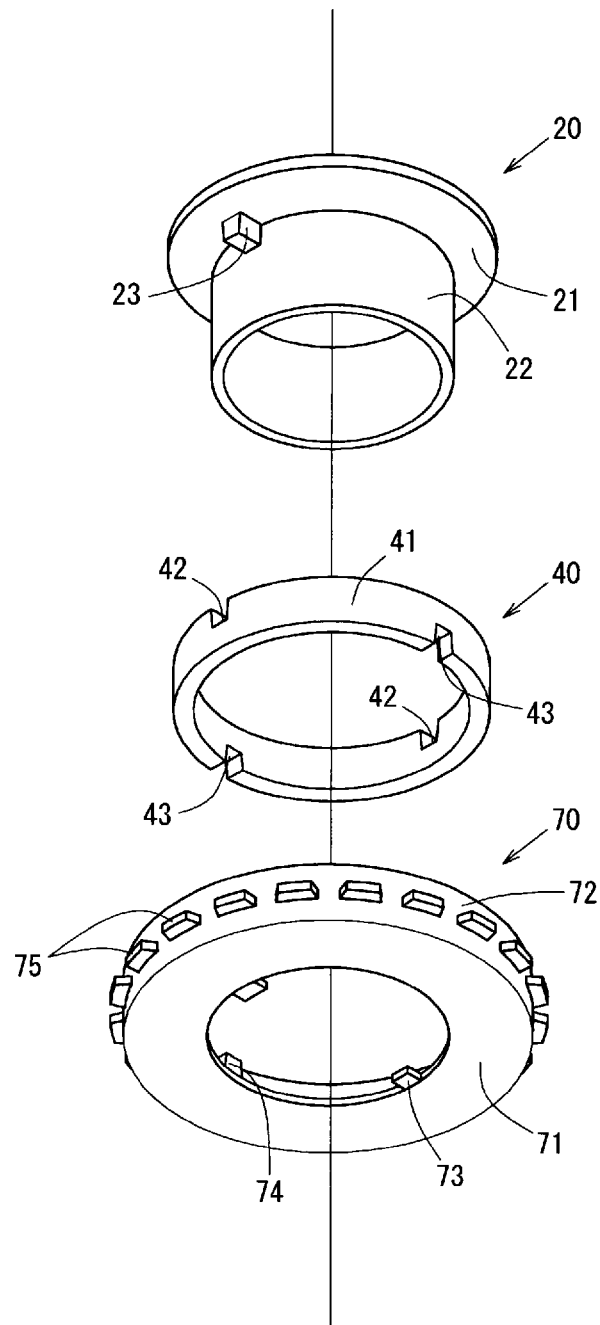
FIG. 3 is a schematic exploded perspective view of a sleeve, a moving member, and a steering device.
Figure 4A:
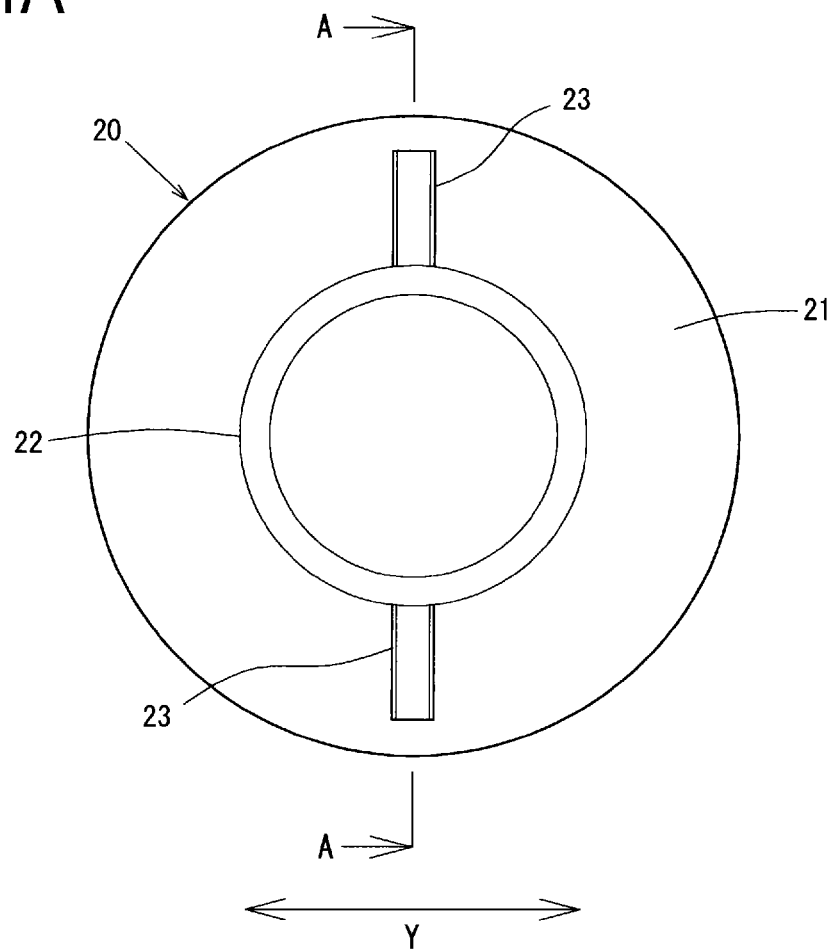
FIGS. 4A and 4B are explanatory diagrams of the sleeve.
Figure 4B:
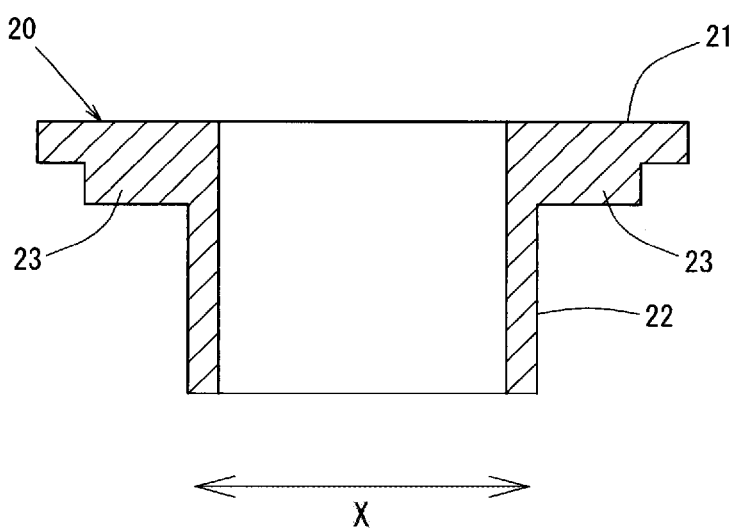
Figure 5A:
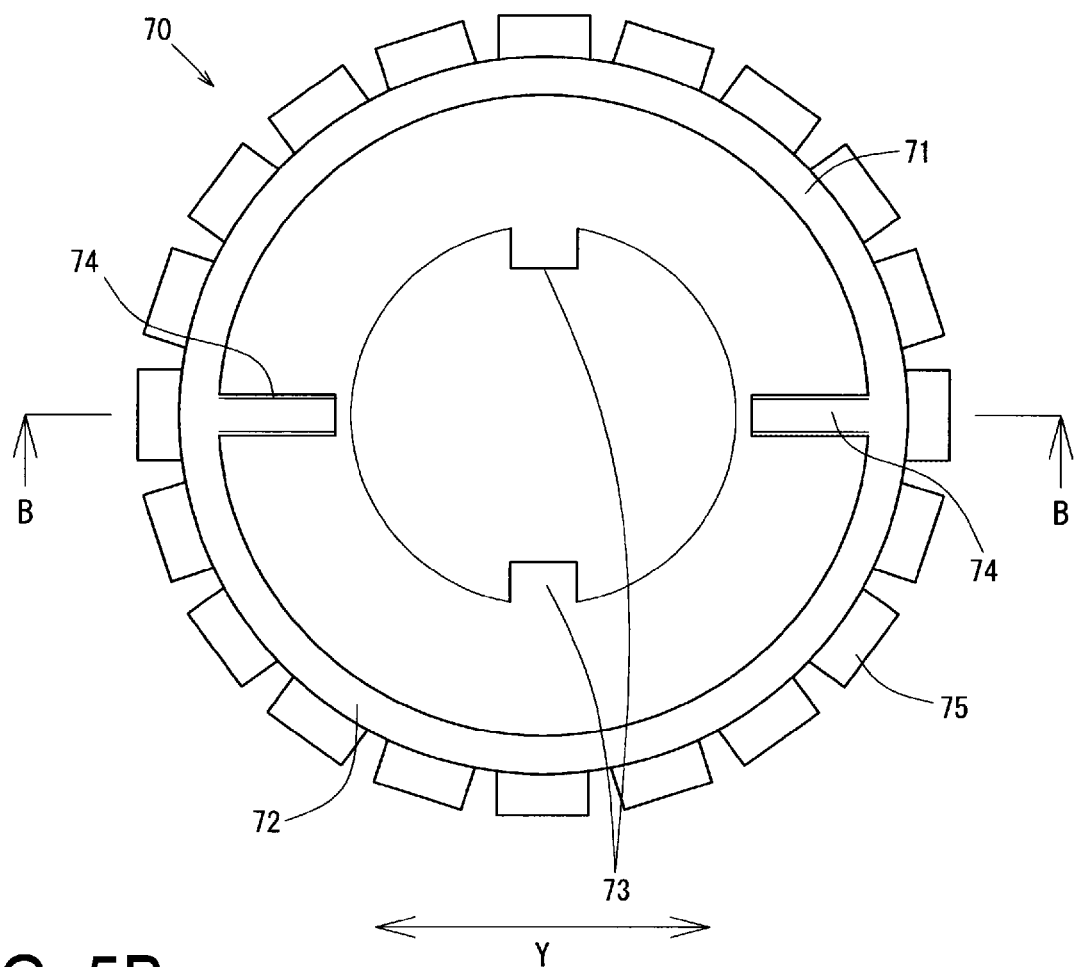
FIGS. 5A and 5B are explanatory diagrams of the rotating portion.
Figure 5B:
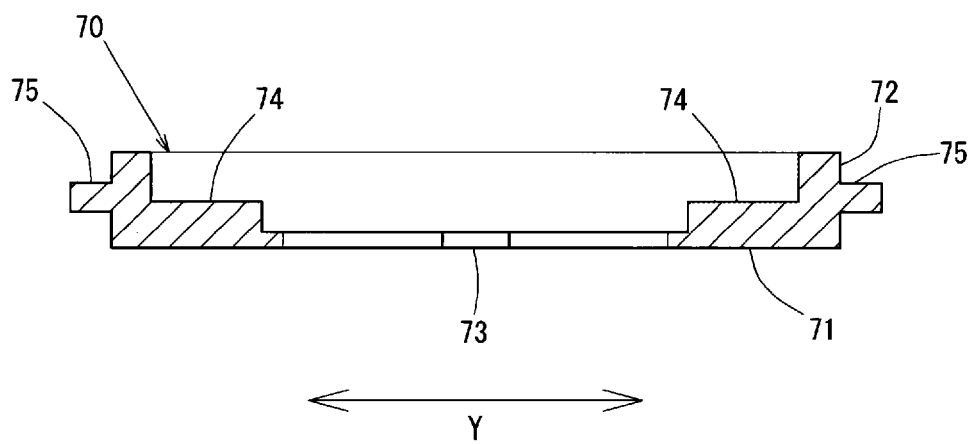
Figure 6A:
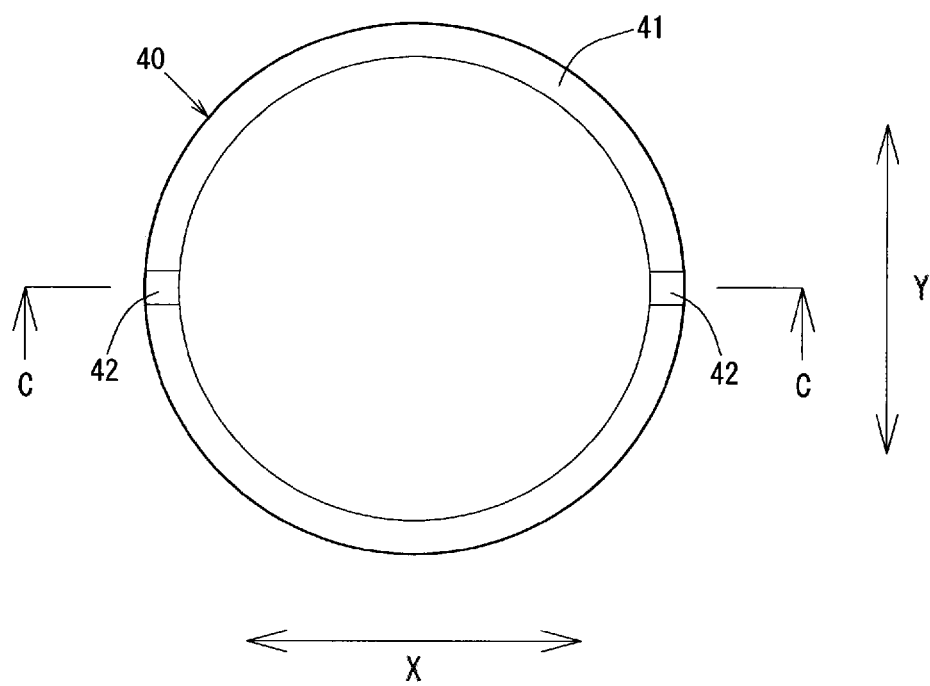
FIGS. 6A and 6B are explanatory diagrams of the moving member.
Figure 6B:
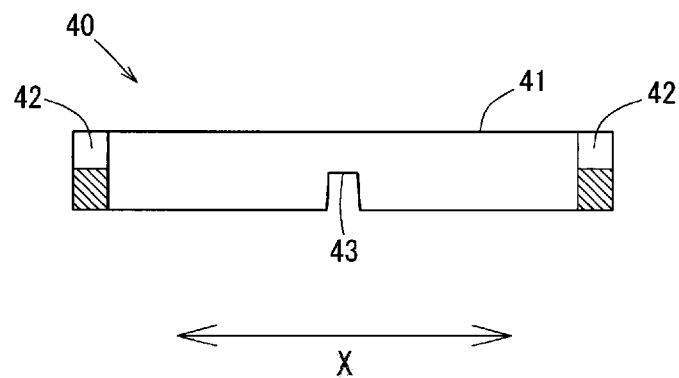

FIG. 3 is an exploded perspective view from below of the sleeve 20, a moving member 40, and a rotating portion 70 constituting the rotary connector device 1. FIGS. 4A and 4B are explanatory diagrams of the sleeve 20. FIGS. 5A and 5B are explanatory diagrams of the rotating portion 70. FIGS. 6A and 6B are explanatory diagrams of the moving member 40.

Referring to FIGS. 4A to 6B, specifically, FIG. 4A is a bottom view of the sleeve 20. FIG. 4B is a cross-sectional view taken along line A-A in FIG. 4A. FIG. 5A is a plan view of the rotating portion 70. FIG. 5B is a cross-sectional view taken along line B-B in FIG. 5A. FIG. 6A is a plan view of the moving member 40. FIG. 6B is a cross-sectional view taken along line C-C in FIG. 6A.

As illustrated in FIG. 1, the assembled structure 2 is configured by the rotary connector device 1 being inserted onto the steering shaft 200 that transfers rotation from operation of a steering wheel 300 to a steering gear box (not illustrated).

Note that the insertion direction of the steering shaft 200 is the vertical direction, and the side from which the steering shaft 200 is inserted into the rotary connector device 1 is the lower side.

The steering shaft 200 includes a thread portion 210 formed on an upper end of the steering shaft 200, a shaft portion 220 for connecting the thread portion 210 and the steering gear box, and a steering column 230 that protects the shaft portion 220 inserted therein. The end of the shaft portion 220 near the vehicle is coupled to the steering gear box.

The thread portion 210 is a screw portion for rotatably fixing the steering wheel 300 and extends through a through-hole of the steering wheel 300. By screwing the thread portion 210 into the steering wheel 300 from above, the steering wheel 300 and the steering shaft 200 can be integrally assembled.

The shaft portion 220 is a hollow annular column-like body with a diameter greater than that of the thread portion 210. The shaft portion 220 is also a shaft for transferring the rotational operation of the steering wheel 300 to the steering gear box.

The steering column 230 is constituted by a cylindrical body for rotatably supporting and protecting the shaft portion 220.

As illustrated in FIGS. 1 and 2, the rotary connector device 1 includes the rotator 10, the sleeve 20 located below the rotator 10 that is assembled with the rotator 10, the stator 30 sandwiched by the rotator 10 and the sleeve 20 and assembled in a manner allowing for the rotator 10 and the sleeve 20 to rotate relative to the stator 30, the moving member 40 fixed to the inner circumferential side of the sleeve 20, and a flexible flat cable 100 stored in a wound up state in a housing space S formed by the rotator 10 and the sleeve 20.

As illustrated in FIG. 2, the rotator 10 includes a substantially annular rotating-side ring plate 11 including a substantially circular through-hole in a central portion in a plan view and an inner circumference wall portion 12 formed extending down from the inner circumferential edge of the rotating-side ring plate 11, the rotating-side ring plate 11 and the inner circumference wall portion 12 being integrally formed. The upper surface of the rotating-side ring plate 11 is provided with a rotator-side connector housing portion 13 that projects upward and functions as a connector.

The inner circumference wall portion 12 is a cylindrical body with a diameter less than the inner diameter of the rotating-side ring plate 11 formed in an annular shape. A rotator-side inner edge portion (not illustrated) projecting radially outward is formed on the lower end side of the inner circumference wall portion 12. Also, the inner circumferential surface of the inner circumference wall portion 12 is provided with an engagement portion (not illustrated) capable of engaging with an engagement target portion (not illustrated) provided on the sleeve 20 described below.

The rotator-side connector housing portion 13 is a housing portion that houses a connection connector attached to one end of the flexible flat cable 100 stored in the housing space S. A connector of a cable (not illustrated) connected to an electric circuit of an external device, such as a horn switch or air bag unit, disposed in the steering wheel 300 is connected here from outside.

As illustrated in FIGS. 2 to 4B, the sleeve 20 is assembled with the rotator 10 configured in this manner and includes a sleeve-side ring plate 21 constituted by an annular ring plate with a central through-hole, and an inner wall portion 22 that projects downward from the inner circumferential edge of the sleeve-side ring plate 21. The bottom surface side of the sleeve-side ring plate 21 is provided with two first guide portions 23 that extend radially outward (see FIGS. 3 and 4A and 4B).

The sleeve-side ring plate 21 is a ring plate including a through-hole centrally provided with an inner diameter equal to the inner diameter of the inner circumference wall portion 12.

The inner wall portion 22 is a cylindrical body projecting downward from the inner circumferential edge of the sleeve-side ring plate 21. The upper surface side of the outer circumferential surface of the inner wall portion 22 is provided with the engagement target portion (not illustrated) capable of engaging with the engagement portion (not illustrated) provided on the inner circumference wall portion 12. The rotator 10 is able to rotate relative to the stator 30 via the engagement of the engagement portion and the engagement target portion when the rotator 10 and the sleeve 20 sandwich the stator 30 from above and below as described below.

As illustrated in FIGS. 4A and 4B, the first guide portions 23 are projection portions projecting radially outward from the outer circumferential surface of the inner wall portion 22 at the bottom surface side of the sleeve-side ring plate 21. In other words, the first guide portions 23 project downward from the bottom surface inner side of the sleeve-side ring plate 21.

The two first guide portions 23 having this configuration are disposed at rotationally symmetrical positions with reference to a rotation axis corresponding to the center axis of the sleeve 20. In other words, the first guide portions 23 are disposed along a line joining the two.

As illustrated in FIG. 2, the stator 30 capable of rotating relative to the rotor 10 includes a main stator 50 and a steering angle sensor 60 provided with the rotating portion 70.

The main stator 50 is a substantially cylindrical body with a closed bottom and an open upper surface. The main stator 50 includes, and is formed integrally with, a stationary-side ring plate 51 constituting the lower surface, a substantially cylindrical outer circumference wall portion 52 constituting the outer circumferential surface, and a stator-side connector housing portion 53 projecting outward from the stator 30.

The stationary-side ring plate 51 is an annular plate-like body with an outer diameter marginally greater than the outer circumferential diameter of the rotating-side ring plate 11 and an inner diameter substantially equal to the inner diameter of the inner circumference wall portion 12. Note that the inner circumferential edge portion of the stationary-side ring plate 51 is sandwiched (not illustrated) by the rotator-side inner edge portion formed on the inner circumference wall portion 12 and the inner circumferential edge portion of the sleeve-side ring plate 21.

The outer circumference wall portion 52 is a cylindrical outer circumference wall erected upward from the outer circumferential edge of the stationary-side ring plate 51.

The stator-side connector housing portion 53 is a rectangular parallelepiped-like housing elongated in the vertical direction overhanging radially outward from a predetermined position of the stator 30. The stator-side connector housing portion 53 is a housing portion capable of housing the other end of the flexible flat cable 100 and configured such that the connection connector for connecting to a cable coming from an electric circuit on the vehicle side in a steering column cover (not illustrated) and the other end of the flexible flat cable 100 can connect together.

Note that, as illustrated in FIGS. 1 and 2, in the neutral state, the rotator-side connector housing portion 13 and the stator-side connector housing portion 53 are disposed at opposite positions from one another.

The steering angle sensor 60 is a cylindrical body with a ring-shaped bottom surface and an open upper surface and include a sensor bottom surface portion 61 configured by an annular plate-like body and an outer circumference protection wall 62 forming an outer circumference wall. The outer circumference protection wall 62 is provided with a sensor portion 63 for detecting angle detection pins 75 that rotates in accordance with the rotation of the rotator 10.

The sensor bottom surface portion 61 is an annular plate-like body including a through-hole with an outer diameter greater than the outer diameter of the sleeve-side ring plate 21 and an inner diameter substantially the same as the inner diameter of the inner wall portion 22.

The outer circumference protection wall 62 is a cylindrical wall erected upward from the outer circumferential edge of the sensor bottom surface portion 61. Two sensor portions 63 are disposed at opposite positions on the inner circumferential surface of the outer circumference protection wall 62. Furthermore, the upper surface of the outer circumference protection wall 62 is provided with an engagement target portion (not illustrated) that engages and locks with an engagement portion (not illustrated) provided on the bottom surface of the stationary-side ring plate 51.

In a state in which the rotating portion 70 is disposed inside the steering angle sensor 60, the sensor portion 63 provided on the outer circumference protection wall 62 is a detection sensor with a recessed shape provided at a position opposing the angle detection pins 75. The sensor portion 63 is formed with a recessed portion at its center in the vertical direction so that the angle detection pins 75 can pass through the central portion. In addition, a detector (not illustrated) is installed inside the sensor portion 63.

A first wall portion 63a formed on the upper side of the recessed portion of the sensor portion 63 is provided with a light-emitting element (not illustrated), and a second wall portion 63b formed on the lower side of the recessed portion is provided with a light-receiving element (not illustrated) opposing the light-emitting element. The installed detector is configured to read a light signal emitted from the light-emitting element.

Two of the sensor portions 63 having this configuration are disposed at rotationally symmetrical positions with reference to a rotation axis corresponding to the center axis of the steering angle sensor 60. In other words, the sensor portions 63 are disposed at opposite positions of the inner circumferential surface of the outer circumference protection wall 62.

As illustrated in FIGS. 2, 3, and 5A and 5B, the rotating portion 70 provided inside the steering angle sensor 60 is a cylindrical body with a closed bottom and includes an annular rotating portion bottom surface 71 and a wall portion 72 erected upward from the outer circumferential edge of the rotating portion bottom surface 71.

The rotating portion bottom surface 71 is an annular ring plate with an inner diameter greater to some degree than the outer diameter of the inner wall portion 22 and an outer diameter less than the outer diameter of the sleeve-side ring plate 21. The inner circumferential edge of the rotating portion bottom surface 71 is provided with two protrusion portions 73 projecting radially inward formed at opposite positions. Furthermore, two second guide portions 74 disposed opposite one another are disposed on the radially outer side of the upper surface of the rotating portion bottom surface 71.

The second guide portions 74 are projection portions extending radially inward from the inner circumferential surface of the wall portion 72 on the bottom surface side of the rotating portion bottom surface 71. Note that the second guide portions 74 are configured to have the same width as the width of the first guide portions 23, respectively.

The two second guide portions 74 having this configuration are disposed at rotationally symmetrical positions with reference to a rotation axis corresponding to the center axis of the rotating portion 70. In other words, the second guide portions 74 are disposed along a line joining the two. Note that the straight line joining the two protrusion portions 73 disposed opposite one another and the straight line joining the two second guide portions 74 disposed opposite one another are orthogonal to one another.

The wall portion 72 is a cylindrical body with an inner diameter greater than the outer diameter of the inner wall portion 22 and an outer diameter marginally less than the inner diameter of the outer circumference protection wall 62. The central portion of the outer circumferential surface of the wall portion 72 is provided with the angle detection pins 75 projecting radially outward disposed at even intervals.

The angle detection pins 75, in the state in which the rotating portion 70 is disposed in the steering angle sensor 60, are formed in a shape capable of passing through the recessed portion of the sensor portion 63.

The rotating portion 70 with such a configuration is, when disposed in the steering angle sensor 60, disposed with the angle detection pins 75 located between the first wall portion 63a and the second wall portion 63b, and the steering angle sensor 60 is capable of detecting the rotation angle of the rotating portion 70.

The moving member 40 is a metal ring plate disposed on the lower side of the rotary connector device 1 with high rigidity. Specifically, the moving member 40 is disposed between the sleeve 20 and the steering angle sensor 60 (on the upper side of the steering angle sensor 60, i.e., the direction in which the steering shaft 200 is inserted in the rotary connector device 1).

Note that the moving member 40 can be formed from a metal, such as stainless steel, iron, and aluminum, and in addition can be formed from a ceramic or a resin, such as plastic.

As illustrated in FIGS. 2, 3 and 6A and 6B, the moving member 40 includes a ring plate 41 with a ring shape having a predetermined plate thickness, two first recessed portions 42, which are portions on the upper surface of the ring plate 41 recessed toward the rotating portion 70 (in other words, downward), and two second recessed portions 43, which are portions on the lower surface of the ring plate 41 recessed upward.

The ring plate 41 is an annular column-like body with an inner diameter greater than the inner diameter of the inner wall portion 22 and an outer diameter less than the inner diameter of the sensor bottom surface portion 61.

The first recessed portion 42 is a recessed portion of the upper surface of the ring plate 41 formed recessing downward. The width in the circumferential direction of the first recessed portion 42 is formed marginally greater than the width of the first guide portion 23. The first recessed portions 42 are disposed at rotationally symmetrical positions with reference to a rotation axis corresponding to the center axis of the ring plate 41. In other words, the first recessed portion 42 is provided at opposite positions. Note that the first recessed portion 42 is formed with a groove depth marginally less than half of the plate thickness of the ring plate 41, and the groove bottom of the first recessed portion 42 is formed flat.

The second recessed portion 43 is a recessed portion of the lower surface of the ring plate 41 formed recessing upward. The width of the second recessed portion 43 is formed marginally greater than the width of the second guide portion 74. In a similar manner to the first recessed portions 42, the two second recessed portions 43 are provided at opposite positions.

The first recessed portions 42 and the second recessed portions 43 with this configuration are disposed at even intervals in the circumferential direction. In other words, the second recessed portions 43 are disposed at positions 90 degrees from the position of the first recessed portion 42 in the clockwise direction R and the counterclockwise direction L. Note that similar to the first recessed portion 42, the second recessed portion 43 is formed with a groove depth marginally less than half of the plate thickness of the ring plate 41, and the groove bottom of the second recessed portion 43 is formed flat.

Hereinafter, the direction in which a straight line joining the first recessed portions 42 disposed in this manner extends is defined as a first direction X, and the direction in which a straight line joining the second recessed portion 43 extends is defined as a second direction Y. In other words, the first direction X and the second direction Y are orthogonal to one another.

Note that in the neutral state, the first direction X of the moving member 40 is aligned with the direction of a straight line joining the rotator-side connector housing portion 13 and the stator-side connector housing portion 53 disposed opposing one another in a plan view.

The rotator 10, the sleeve 20, and the stator 30 with this configuration constitute the rotary connector device 1 in which the rotator 10 and the sleeve 20 are capable of rotation relative to the stator 30. Specifically, the rotary connector device 1 is configured such that the inner circumferential edge of the stationary-side ring plate 51 is sandwiched by the inner circumferential edge portion of the inner circumference wall portion 12 and the sleeve-side ring plate 21 and an engagement portion (not illustrated) provided on the sleeve 20 and an engagement target portion (not illustrated) provided on the inner circumference wall portion 12 are engaged. Note that the steering angle sensor 60 is fixed to the main stator 50 by the engagement portion (not illustrated) being engaged with the engagement target portion (not illustrated).

In addition, in rotary connector device 1, the housing space S that houses the flexible flat cable 100 is formed by the rotating-side ring plate 11 and the inner circumference wall portion 12 of the rotator 10 and the stationary-side ring plate 51 and the outer circumference wall portion 52 of the stator 30 (see FIG. 2).

The flexible flat cable 100 is configured by overlapping four flat cables (a first dummy flat cable, a shield flat cable, a transmission line flat cable, and a second dummy flat cable) from the radially outer side to the radially inner side in a wound up state in the housing space S, and flexible flat cable 100 is housed wound up in the housing space S in a manner allowing the flexible flat cable 100 to be wound and unwound in the clockwise direction R and the counterclockwise direction L in sync with rotation of the rotator 10 relative to the stator 30. Note that in the present embodiment, the flexible flat cable 100 includes four flat cables. However, this number is not limited to four, and the number and configuration of the flexible flat cable 100 can be changed as appropriate.

Figure 7A:
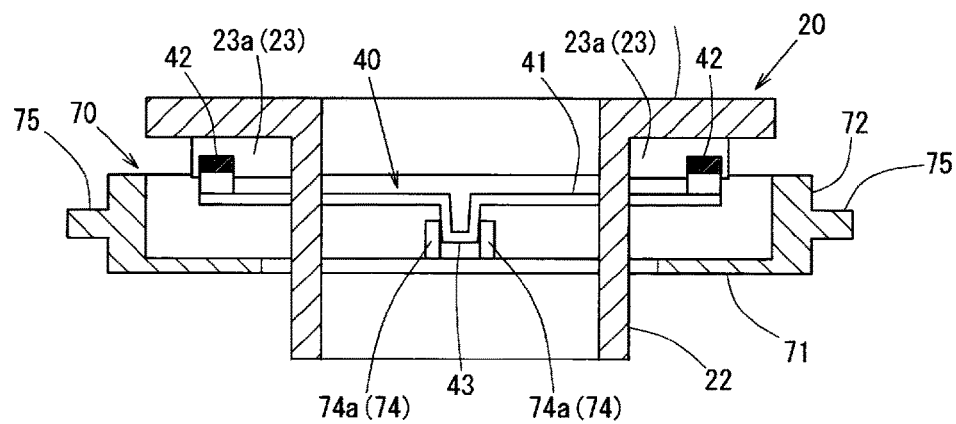
FIGS. 7A to 7C are explanatory diagrams of a state in which the sleeve and the steering device are assembled together with the moving member.

As illustrated in FIG. 7A, the rotary connector device 1 with such a configuration is assembled in the order of, from above, the sleeve 20, the moving member 40, and the rotating portion 70 provided in the steering angle sensor 60. The assembled state of the rotary connector device 1 with such a configuration in terms of the sleeve 20 and the moving member 40 and the assembled state in terms of the sleeve 20 and the rotating portion 70 will now be described with reference to FIGS. 7A to 7C.

Figure 7B:
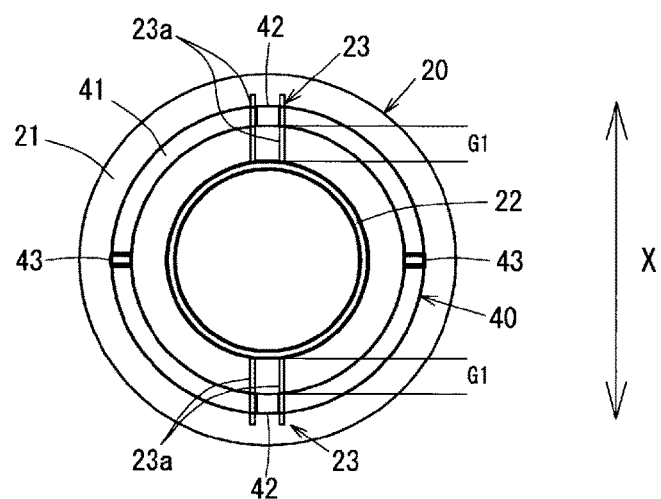
Figure 7C:
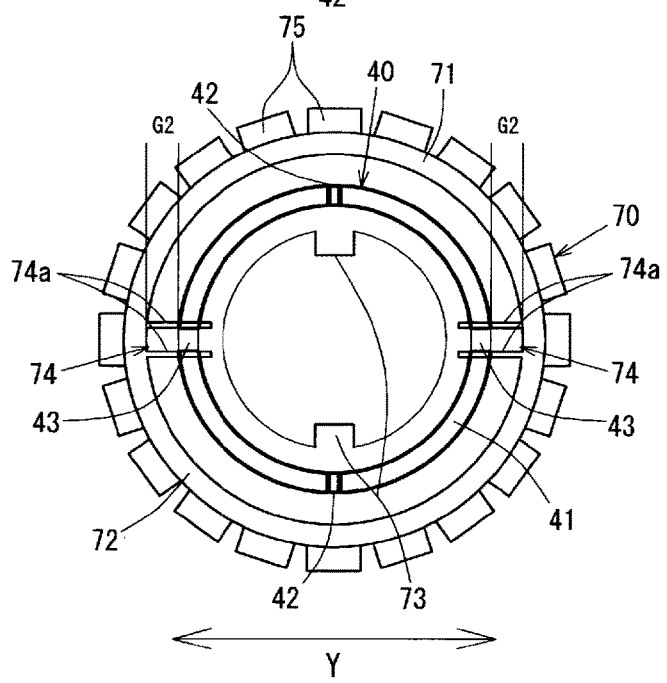

Here, FIGS. 7A to 7C are explanatory diagrams of the assembled state of the sleeve 20, the moving member 40, and the rotating portion 70 in a state in which the center axis of all are in alignment. Specifically, FIG. 7A is a cross-sectional view illustrating a state in which the sleeve 20, the moving member 40, and the rotating portion 70 are assembled. FIG. 7B is a bottom view illustrating a state in which the sleeve 20 and the moving member 40 are assembled. FIG. 7C is a plan view illustrating a state in which the moving member 40 and the rotating portion 70 are assembled. Note that to clarify the assembled state of the sleeve 20, the moving member 40, and the rotating portion 70, the steering angle sensor 60 including the rotating portion 70 is omitted from the drawings.

Additionally, in FIGS. 7A to 7C, the first recessed portions 42 and the second recessed portions 43 are located at a location hidden from view. To clarify their locations, their locations are indicated by dashed lines.

The sleeve 20, the moving member 40, and the rotating portion 70 can be assembled in the following manner: the moving member 40 is disposed above the rotating portion 70 with the second recessed portions 43 being disposed at positions corresponding to the second guide portions 74, and the sleeve 20 is disposed above the moving member 40 with the first guide portions 23 disposed at positions corresponding to the first recessed portions 42 of the moving member 40. The sleeve 20 and the rotating portion 70 are then moved in the vertical direction relative to the moving member 40.

In the assembled state of the sleeve 20, the moving member 40, and the rotating portion 70 illustrated in FIG. 7A, the two first recessed portions 42 formed along the first direction X loosely fit together with the first guide portions 23. Thus, the first recessed portions 42 are guided by the first guide portions 23, allowing the moving member 40 to move in the first direction X. Also, the two second recessed portions 43 formed along the second direction Y loosely fit together with the second guide portions 74. Thus, the second recessed portions 43 are guided by the second guide portions 74, allowing the moving member 40 to move in the second direction Y.

In addition, because the inner diameter of the ring plate 41 is greater than the inner diameter of the inner wall portion 22, as illustrated in FIG. 7B, the inner circumferential surface of the ring plate 41 is disposed separated from the inner wall portion 22 a predetermined distance. In other words, a predetermined first clearance G1 is provided between the inner diameter side of the first recessed portions 42 and the inner wall portion 22. Accordingly, the moving member 40 can move in the first direction X relative to the sleeve 20.

Similarly, because the outer diameter of the wall portion 72 is greater than the outer diameter of the ring plate 41, as illustrated in FIG. 7C, the outer circumferential surface of the ring plate 41 is disposed separated from the inner circumferential surface of the wall portion 72 a predetermined distance. In other words, a predetermined second clearance G2 is provided between the radially outer side of the second recessed portions 43 loosely fit together with the second guide portions 74 and the wall portion 72. Accordingly, the moving member 40 can move in the second direction Y relative to the rotating portion 70.

Next, in the assembled structure 2 with the steering shaft 200 assembled together with the rotary connector device 1, the movement of the moving member 40 when a rotation axis Rx of the steering shaft 200 and the center axis Cx of the rotary connector device 1 are eccentric will be described with reference to FIGS. 8A to 8E.

FIGS. 8A to 8E are explanatory diagrams for describing the movement of the moving member 40 in the assembled structure 2 with the steering shaft 200 assembled together with the rotary connector device 1 in a neutral state. Specifically, FIG. 8A is a plan view of the rotary connector device 1 in a state in which the steering shaft 200 is inserted. FIG. 8B is a bottom view of the sleeve 20 assembled together with the moving member 40 in the assembled structure 2 of FIG. 8A. FIG. 8C is cross-sectional view taken along line A-A of FIG. 8B. FIG. 8D is a plan view of the rotating portion 70 assembled together with the moving member 40 in the assembled structure 2 of FIG. 8A. FIG. 8E is a cross-sectional view taken along line B-B of FIG. 8D.

Note that in FIGS. 8A to 8E, the first recessed portions 42 and the second recessed portions 43 are located at a location hidden from view. To clarify their locations, their locations are indicated by dashed lines.

Also, note that in FIG. 8A, the upper side of the first direction X (rotator-side connector housing portion 13 side) is defined as the +X side and the lower side of the first direction X (the stator-side connector housing portion 53 side) is defined as the −X side. In FIG. 8A, the left side is defined as the −Y side, and the right side is defined as the +Y side. Furthermore, in FIGS. 8A to 8E, the steering shaft 200 is omitted in order to facilitate the description thereof.

As illustrated in FIG. 8A, when the steering shaft 200 is assembled together with the rotary connector device 1 with the rotation axis Rx of the steering shaft 200 inserted into the rotary connector device 1 being eccentric to the upper left of the center axis Cx of the rotary connector device 1, the rotation axis Rx is eccentric to the +X side of the first direction X and to the −Y side of the second direction Y.

Here, because the moving member 40 can move in the first direction X due to the first recessed portions 42 being guided by the first guide portion 23 to which the first recessed portions 42 are loosely fitted, as illustrated in FIGS. 8B and 8C, the moving member 40 is disposed on the −X side relative to the sleeve 20. However, because second recessed portions 43 loosely fitted together with the second guide portions 74 cannot move in the first direction X, the rotating portion 70 is disposed in the center of the moving member 40 in the first direction X. Thus, the eccentric state of the center axis (rotation axis Rx) of the sleeve 20 and the center axis Cx of the rotating portion 70 in the first direction X can be absorbed by the moving member 40.

Here, because the moving member 40 can move in the second direction Y due to the second recessed portions 43 being guided by the second guide portions 74 to which the second recessed portions 43 are loosely fitted, as illustrated in FIGS. 8D and 8E, the moving member 40 is disposed on the −Y side relative to the rotating portion 70. However, because first recessed portions 42 loosely fitted together with the first guide portion 23 cannot move in the second direction Y, the sleeve 20 is disposed in the center of the moving member 40 in the second direction Y. Thus, the eccentricity of the center axis (rotation axis Rx) of the sleeve 20 and the center axis Cx of the rotating portion 70 in the second direction Y can be absorbed by the moving member 40.

In this manner, because the eccentricity of the center axis (rotation axis Rx) of the sleeve 20 and the center axis Cx of the rotating portion 70 can be absorbed by the moving member 40, the rotation of the sleeve 20 can be transferred via the moving member 40, allowing the rotating portion 70 to be rotated smoothly. Accordingly, the angle detection pins 75 pass through the sensor portion 63 with good accuracy, allowing the detector installed in the sensor portion 63 to accurately detect the rotation angle of the rotating portion 70, i.e., the rotation angle of the steering shaft 200.

In this way, the rotary connector device 1 includes: the stator 30 configured to be fixed to a vehicle, the stator 30 including the annular stationary-side ring plate 51 and the cylindrical outer circumference wall portion 52 formed on the outer circumferential edge of the stationary-side ring plate 51; the rotator 10 assembled together with the stator 30 in a manner allowing for rotation relative to the stator 30, the rotator 10 including the annular rotating-side ring plate 11 and the cylindrical inner circumference wall portion 12 formed on the inner circumferential edge of the rotating-side ring plate 11; and the flexible flat cable 100 stored in the housing space S formed between the stator 30 and the rotator 10, the flexible flat cable 100 including a conductor with one end portion fixed to the stator 30 and another end portion fixed to the rotator 10. The rotary connector device 1 has a configuration in which: the moving member 40 configured to transfer rotation of the rotator 10 to the stator 30 is provided on an insertion direction side of the stator 30 in a direction in which the steering shaft 200 is inserted in the inner circumference wall portion 12; the moving member 40 includes the first recessed portion 42 formed, in the first direction X orthogonal to the direction of the center axis Cx about which the stator 30 rotates, recessed in the insertion direction, and the second recessed portion 43 formed, in the second direction Y that intersects the first direction X and is orthogonal to the center axis Cx, recessed in the direction opposite to that of the first recessed portion 42; the sleeve 20 configured to rotate integrally with the rotator 10 includes the first guide portion 23 configured to loosely fit together with the first recessed portion 42; the steering angle sensor 60 at a portion of the stator 30 includes the rotating portion 70 configured to rotate about the center axis Cx, and the rotating portion 70 includes the second guide portion 74 configured to loosely fit together with the second recessed portion 43; and the first recessed portion 42 loosely fitted together with the first guide portion 23 and the second recessed portion 43 loosely fitted together with the second guide portion 74 are guided by the first guide portion 23 and the second guide portion 74 in a manner allowing for movement in the first direction X and the second direction Y. With this configuration, even in the case in which the rotation axis Rx of the steering shaft 200 and the center axis Cx of the rotary connector device 1 are eccentric, the rotating portion 70 at a portion of the stator 30 can smoothly rotate.

Specifically, the first recessed portion 42 loosely fitted together with the first guide portion 23 provided on the sleeve 20 is guided by the first guide portion 23, and the moving member 40 moves in the first direction X. This allows the eccentricity in the first direction X between the sleeve 20 (rotator 10) and the rotating portion 70 (stator 30) constituting the rotary connector device 1 to be absorbed.

Similarly, the second recessed portion 43 loosely fitted together with the second guide portion 74 provided on the rotating portion 70 is guided by the second guide portion 74, and the moving member 40 moves in the second direction Y. This allows the eccentricity in the second direction Y between the sleeve 20 and the rotating portion 70 constituting the rotary connector device 1 to be absorbed.

In this manner, the eccentricity between the sleeve 20 and the rotating portion 70 that rotate together with the rotator 10 that constitutes the rotary connector device 1 can be absorbed by the first recessed portion 42 and the second recessed portion 43. In other words, the eccentricity between the rotation axis Rx of the steering shaft 200 and the center axis Cx of the rotating portion 70 can be absorbed, allowing the rotation of the steering shaft 200 to be transferred to the rotating portion 70 as rotation about the center axis Cx. In this way, when the rotation axis Rx of the steering shaft 200 and the center axis Cx of the rotary connector device 1 are eccentric to one another, the rotation of the steering shaft 200 can be transferred to the rotating portion 70 with high accuracy.

Additionally, the first recessed portion 42 is recessed to the rotating portion 70 side (lower side), and the second recessed portion 43 is recessed in the direction opposite (upper side) to the recessed direction of the first recessed portion 42. This allows the rotation of the steering shaft 200 to be transferred to the moving member 40 with high accuracy.

Specifically, by the first guide portion 23 being loosely fitted together with the first recessed portion 42, the bottom surface of the sleeve-side ring plate 21 of the sleeve 20 that is fixed to the rotator 10 and the upper surface of the ring plate 41 of the moving member 40 come into contact (see FIGS. 8C and 8E).

Also, by the second guide portion 74 being loosely fitted together with the second recessed portion 43, the lower surface of the ring plate 41 of the moving member 40 and the upper surface of the rotating portion bottom surface 71 of the rotating portion 70 come into contact (see FIGS. 8C and 8E). Accordingly, the moving member 40 can be stably disposed.

Thus, the movement in the first direction X enabled by the first recessed portion 42 and the first guide portion 23 being loosely fitted together and movement in the second direction Y enabled by the second recessed portion 43 and the second guide portion 74 being loosely fitted together allow the first guide portion 23 and the second guide portion 74 to be stably moved without tilting and prevent warping of the moving member 40 (ring plate 41) due to the load on the moving member 40. In this way, the rotation of the steering shaft 200 can be more accurately transferred to the rotating portion 70.

Additionally, the plate thickness of the moving member 40 is thick, giving the moving member 40 high rigidity and sufficient strength against the load thereon during rotation when the eccentricity between the rotation axis Rx of the steering shaft 200 and the center axis Cx of the rotary connector device 1 is absorbed.

Also, the first recessed portions 42 are provided at rotationally symmetrical positions with the center axis Cx of the stator 30 as a symmetrical axis, and the second recessed portions 43 are provided at rotationally symmetrical positions with the center axis Cx of the stator 30 as a symmetrical axis. In this way, the two of the first recessed portions 42 and the two of the second recessed portions 43 are disposed at opposite positions. This allows the rotation of the steering shaft 200 to be transferred to the stator 30 more stable.

Because the first direction X and the second direction Y are orthogonal to one another, the load acting on the moving member 40 is divided into that in the first direction X and that in the second direction Y orthogonal thereto. This allows the load to evenly act in the first direction and the second direction. In this way, the rotation of the steering shaft 200 can be transferred to the rotating portion 70 with greater stability, and load concentration in one direction can be prevented.

Furthermore, because the first clearance G1 and the second clearance G2 are provided between the rotator 10 and the stator 30 and the moving member 40 in the first direction X and the second direction Y, the first recessed portion 42 and the second recessed portion 43 can be moved reliably in the first direction X and the second direction Y. This allows the eccentricity between the steering shaft 200 and the rotating portion 70 to be reliably absorbed.

Also, because the rotating portion 70 that supports the moving member 40 is provided between the moving member 40 and the stator 30, the rotation of the steering shaft 200 can be transferred to the steering angle sensor 60 of the stator 30 via the rotating portion 70. This allows existing stators 30 to be used.

Furthermore, the stator 30 includes the main stator 50 including the stationary-side ring plate 51 and the outer circumference wall portion 52 and the steering angle sensor 60 that is fixed to the main stator 50 and includes the rotating portion 70. This configuration allows the rotating portion 70 to rotate smoothly in accordance with the rotation of the sleeve 20. In this way, the rotation of the steering shaft 200 can be accurately transferred to a cancel cam, for example, allowing the turn lever to be accurately returned to the neutral position.

Additionally, the steering angle sensor 60 is configured to detect the rotation angle of the steering shaft 200. This allows the rotation angle of the steering shaft 200 to be accurately detected. Thus, for example, in a vehicle type in which the illumination direction of the front lights changes in accordance with the rotation angle of the steering shaft 200, the illumination direction of the front lights can be made more accurate.

The terms in the disclosure and the terms in the embodiments described above correspond in the following manner:

fixed body corresponds to the stator 30, rotation body corresponds to the rotator 10, rotation transmission mechanism corresponds to the moving member 40, first direction corresponds to the first direction X, first guide target portion corresponds to the first recessed portion 42, second direction corresponds to the second direction Y, second guide target portion corresponds to the second recessed portion 43, gap corresponds to the first clearance G1 and the second clearance G2, and support member corresponds to the rotating portion 70. However, the disclosure is not limited to the configuration of the embodiments only, and various embodiments are possible.

For example, in the configuration described above, the rotator 10 of the rotary connector device 1 cooperates with the sleeve 20 and is rotatably assembled together with the stator 30. However, another configuration may only include a rotator including the annular rotating-side ring plate 11 and a cylindrical rotating-side inner-circumferential cylindrical portion formed on the inner circumferential edge of the rotating-side ring plate 11.

In the configuration described above, the first recessed portion 42 is a recessed portion recessed in the direction opposite to the insertion direction in which the rotary connector device 1 is inserted on the steering shaft 200. However, the embodiment is not limited to this configuration, and the first recessed portion 42 may be a protrusion portion projecting in the insertion direction.

Similar to the configuration of the first recessed portion 42, in the configuration described above, the second recessed portion 43 is a recessed portion recessed in the insertion direction in which the rotary connector device 1 is inserted on the steering shaft 200. However, the second recessed portion 43 may be a protrusion portion projecting in the direction opposite to the insertion direction.

Figure 9:
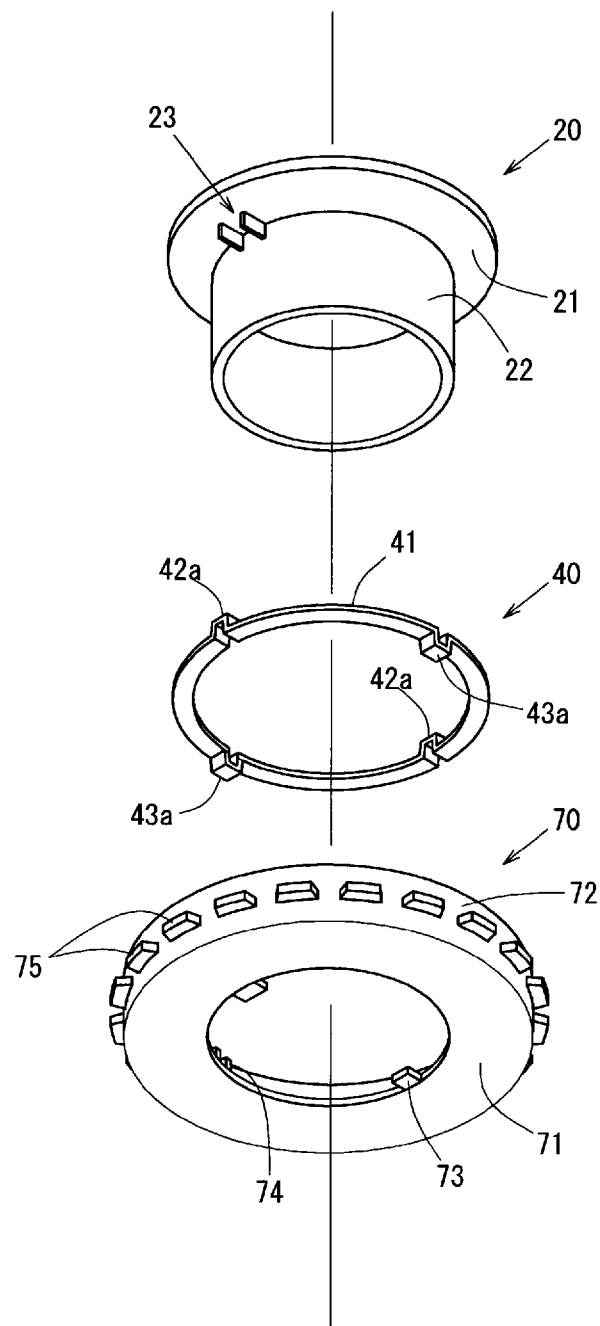
FIG. 9 is a schematic exploded perspective view of a moving member of another embodiment.

Note that a configuration (see FIG. 9) in which the first recessed portion 42 is constituted by a first protrusion portion 42a projecting toward the stationary-side ring plate 51 and the second recessed portion 43 is constituted by a second protrusion portion 43a projecting in the direction opposite to the projecting direction of the first protrusion portion 42a allows the rotary connector device 1 to be made compact. In this case, the associated first guide portion 23 and the second guide portion 74 have a recessed shape capable of being loosely fitted together with the first protrusion portion 42a and the second protrusion portion 43a.

Specifically, because the first recessed portion 42 is constituted by a first protrusion portion 42a projecting toward the stationary-side ring plate 51 and the second recessed portion 43 is constituted by a second protrusion portion 43a projecting in the direction opposite to the projecting direction of the first protrusion portion 42a, in the case in which the ring plate 41 is formed thin, when the moving member 40 is brought towards the rotating portion 70 and the rotator 10, the first protrusion portion 42a and the rotating portion 70 do not interfere with one another and the second protrusion portion 43a and the sleeve 20 do not interfere with one another. This allows the rotary connector device 1 to be made compact.

Additionally, in the present embodiment, rotating portion 70 rotates with the center axis Cx as a rotation center. However, the rotating portion 70 may pivot about the center axis Cx.

Also, instead of the steering angle sensor 60, a combination switch installed in the rotary connector device 1 or a cancel cam that returns the rotation of a turn lever to a neutral position may be provided.

REFERENCE SIGNS LIST

1 Rotary connector device
10 Rotator
11 Rotating-side ring plate
12 Inner circumference wall portion
23 First guide portion
30 Stator
40 Moving member
42 First recessed portion
43 Second recessed portion
50 Main stator
51 Stationary-side ring plate
52 Outer circumference wall portion
60 Steering angle sensor
70 Rotating portion
74 Second guide portion
100 Flexible flat cable
200 Steering shaft
G1 First clearance
G2 Second clearance
S Housing space
X First direction
Y Second direction

The invention claimed is:

1. A rotary connector device, comprising:
a fixed body configured to be fixed to a vehicle, the fixed body including a stationary-side ring plate having an annular shape and an outer circumference wall portion having a cylindrical shape and formed on an outer circumferential edge of the stationary-side ring plate;
a rotation body assembled together with the fixed body in a manner allowing for rotation relative to the fixed body, the rotation body including a rotating-side ring plate having an annular shape and an inner circumference wall portion having a cylindrical shape and formed on an inner circumferential edge of the rotating-side ring plate; and
a flexible flat cable stored in a housing space formed between the fixed body and the rotation body, the flexible flat cable including a conductor with one end portion fixed to the fixed body and another end portion fixed to the rotation body,
wherein a rotation transmission mechanism configured to transfer rotation of the rotation body to the fixed body is provided on an insertion direction side of the fixed body in a direction in which a steering shaft is inserted in the inner circumference wall portion;
the rotation transmission mechanism includes
a first guide target portion formed, in a first direction orthogonal to a rotation axial direction about which the fixed body rotates, as a protrusion portion projecting or a recessed portion recessed in the insertion direction of the steering shaft, and a second guide target portion formed, in a second direction that intersects the first direction and is orthogonal to the rotation axial direction, as a protrusion portion projecting or a recessed portion recessed in a direction opposite to a direction in which the protrusion portion of the first guide target portion projects or the recessed portion of the first guide target portion recesses;

the rotation body includes a first guide portion configured to loosely fit together with the first guide target portion;

the fixed body includes a rotating portion configured to rotate about a center axis, and the rotating portion includes a second guide portion configured to loosely fit together with the second guide target portion; and the first guide target portion loosely fitted together with the first guide portion and the second guide target portion loosely fitted together with the second guide portion are guided by the first guide portion and the second guide portion in a manner allowing for movement in the first direction and the second direction.

2. The rotary connector device according to claim 1, wherein
the first guide target portion is constituted by a first recessed portion recessed toward the rotating portion; and
the second guide target portion is constituted by a second recessed portion recessed in a direction opposite to a recessed direction of the first guide target portion.

3. The rotary connector device according to claim 1, wherein
the first guide target portion is constituted by a first protrusion portion projecting toward the stationary-side ring plate; and
the second guide target portion is constituted by a second protrusion portion projecting in a direction opposite to a projecting direction of the first guide target portion.

4. The rotary connector device according to claim 1, wherein
a plurality of the first guide target portions are disposed at rotationally symmetrical positions with a rotation axis of the fixed body as a symmetrical axis; and
a plurality of the second guide target portions are disposed at rotationally symmetrical positions with the rotation axis of the fixed body as a symmetrical axis.

5. The rotary connector device according to claim 1, wherein
the first direction and the second direction are orthogonal to one another.

6. The rotary connector device according to claim 1, wherein
the rotation transmission mechanism is constituted by a rigid member ring plate.

7. The rotary connector device according to claim 1, wherein
a gap is provided between the rotation transmission mechanism and the fixed body in the first direction and the second direction.

8. The rotary connector device according to claim 1, wherein
a support member supporting the rotation transmission mechanism is provided between the rotation transmission mechanism and the fixed body.

9. The rotary connector device according to claim 1, wherein
the fixed body includes
a first fixed body including the stationary-side ring plate and the outer circumference wall portion, and
a second fixed body fixed to the first fixed body and including the rotating portion.

10. The rotary connector device according to claim 9, wherein
the second fixed body includes a steering angle sensor configured to detect a rotation angle of the steering shaft.

11. A rotary connector device assembled structure, comprising:
a rotary connector device and a steering shaft assembled together,
the rotary connector device including
a fixed body configured to be fixed to a vehicle, the fixed body including a stationary-side ring plate having an annular shape and an outer circumference wall portion having a cylindrical shape and formed on an outer circumferential edge of the stationary-side ring plate,
a rotation body assembled together with the fixed body in a manner allowing for rotation relative to the fixed body, the rotation body including a rotating-side ring plate having an annular shape and an inner circumference wall portion having a cylindrical shape and formed on an inner circumferential edge of the rotating-side ring plate, and
a flexible flat cable stored in a housing space formed between the fixed body and the rotation body, the flexible flat cable including a conductor with one end portion fixed to the fixed body and another end portion fixed to the rotation body; and
the steering shaft inserted in the inner circumference wall portion and configured to rotate integrally with the rotation body;
wherein a rotation transmission mechanism configured to transfer rotation of the rotation body to the fixed body is provided on an insertion direction side of the fixed body in a direction in which the steering shaft is inserted in the inner circumference wall portion;
the rotation transmission mechanism includes
a first guide target portion formed, in a first direction orthogonal to a rotation axial direction about which the fixed body rotates, as a protrusion portion projecting or a recessed portion recessed in the insertion direction of the steering shaft, and
a second guide target portion formed, in a second direction that intersects the first direction and is orthogonal to the rotation axial direction, as a protrusion portion projecting or a recessed portion recessed in a direction opposite to a direction in which the protrusion portion of the first guide target portion projects or the recessed portion of the first guide target portion recesses;
the rotation body includes a first guide portion configured to loosely fit together with the first guide target portion;
the fixed body includes a rotating portion configured to rotate about a center axis, and the rotating portion includes a second guide portion configured to loosely fit together with the second guide target portion; and
the first guide target portion loosely fitted together with the first guide portion and the second guide target portion loosely fitted together with the second guide portion are guided by the first guide portion and the second guide portion in a manner allowing for movement in the first direction and the second direction.

* * * * *